United States Patent
Kim (10) Patent No.: US 10,452,314 B2
(45) Date of Patent: Oct. 22, 2019

(54) ELECTRONIC SYSTEMS AND METHODS OF OPERATING ELECTRONIC SYSTEMS

(71) Applicant: Samsung Electronics Co., Ltd., Suwon-si, Gyeonggi-do (KR)

(72) Inventor: Dong-Min Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 425 days.

(21) Appl. No.: 15/410,931

(22) Filed: Jan. 20, 2017

(65) Prior Publication Data

US 2018/0004455 A1  Jan. 4, 2018

(30) Foreign Application Priority Data

Jun. 29, 2016  (KR) .................. 10-2016-0081805

(51) Int. Cl.
*G06F 3/06* (2006.01)
*G06F 11/07* (2006.01)

(52) U.S. Cl.
CPC .......... *G06F 3/0659* (2013.01); *G06F 3/0617* (2013.01); *G06F 3/0673* (2013.01); *G06F 11/0757* (2013.01)

(58) Field of Classification Search
CPC ... G06F 3/0617; G06F 3/0659; G06F 11/0757
See application file for complete search history.

(56) References Cited

U.S. PATENT DOCUMENTS

| | | |
|---|---|---|
| 6,526,433 B1 | 2/2003 | Chang et al. |
| 7,679,133 B2 | 3/2010 | Son et al. |
| 7,941,578 B2 | 5/2011 | Kimoto et al. |
| 8,040,767 B2 | 10/2011 | Ikeda |
| 8,553,466 B2 | 10/2013 | Han et al. |
| 8,559,235 B2 | 10/2013 | Yoon et al. |
| 8,654,587 B2 | 2/2014 | Yoon et al. |
| 9,128,633 B2 | 9/2015 | Lim |
| 9,176,827 B2 | 11/2015 | Boldo et al. |

(Continued)

FOREIGN PATENT DOCUMENTS

| | | |
|---|---|---|
| JP | 2004/334554 A | 11/2004 |
| JP | 2006/155239 A | 6/2006 |

(Continued)

*Primary Examiner* — Nicholas J Simonetti
(74) *Attorney, Agent, or Firm* — Harness, Dickey & Pierce, P.L.C.

(57) ABSTRACT

A method includes transmitting a command signal including a time-out time from a host to a storage device; determining, by the storage device, a first time amount, which is an amount of time required for the storage device to perform an operation corresponding to the command signal; when the first time amount is not greater than the time-out time, providing a first response signal including a success flag from the storage device to the host after the storage device performs the operation within the time-out time; when the first time amount is longer than the time-out time, providing a second response signal including the first time amount and a time-out reset flag from the storage device to the host; and when the host receives the second response signal, retransmitting the command signal to the storage device after the host resets the time-out time to the first time amount.

20 Claims, 8 Drawing Sheets

(56) References Cited

U.S. PATENT DOCUMENTS

| | | | |
|---|---|---|---|
| 9,298,531 B1* | 3/2016 | Sheets | G06F 11/0721 |
| 2011/0154134 A1* | 6/2011 | Kohada | G06F 11/0757 |
| | | | 714/54 |
| 2011/0233648 A1 | 9/2011 | Seol et al. | |
| 2013/0238941 A1* | 9/2013 | Ando | G06F 11/0757 |
| | | | 714/42 |
| 2014/0195861 A1* | 7/2014 | Singh | G06F 11/3466 |
| | | | 714/47.2 |
| 2015/0006830 A1* | 1/2015 | Shin | G06F 3/0659 |
| | | | 711/154 |
| 2016/0041857 A1 | 2/2016 | Banerjee et al. | |

FOREIGN PATENT DOCUMENTS

| | | |
|---|---|---|
| JP | 2010/182216 A | 8/2010 |
| JP | 2011/095869 A | 5/2011 |
| JP | 5107096 B2 | 12/2012 |

\* cited by examiner

ELECTRONIC SYSTEMS AND METHODS OF OPERATING ELECTRONIC SYSTEMS

CROSS-REFERENCE TO RELATED APPLICATION(S)

This application claims priority under 35 USC § 119 to Korean Patent Application No. 10-2016-0081805, filed on Jun. 29, 2016 in the Korean Intellectual Property Office (KIPO), the contents of which are incorporated herein by reference in their entirety.

BACKGROUND

1. Technical Field

Example embodiments relate to an electronic system, and more particularly to an electronic system including a storage device and a method of operating an electronic system including a storage device.

2. Description of the Related Art

Generally, an electronic system includes a storage device and a host for driving the storage device. The hose transmits various kinds of command signals to the storage device, and the storage device performs operations corresponding to the command signals and then provides a response signal to the host.

When an error has occurred in the storage device such that the storage device could not perform the operations corresponding to the command signals, the host does not receive the response signal from the storage device. To prevent the host from waiting for the response signal indefinitely, the host sets a time-out time in the command signal, and then transmits the command signal to the storage device. When the host does not receive the response signal from the storage device within the time-out time, the host retransmits the command signal to the storage device.

In addition, when the host retransmits the command signal to the storage device more than a predetermined number of times, the host determines that an error has occurred in the storage device and resets the storage device to recover the storage device.

After the storage device is recovered, the host retransmits the command signal to the storage device such that the storage device performs the operation corresponding to the command signal.

Since the storage device is reset after the predetermined number of times of the time-out time when an error is occurred in the storage device, it takes much time to recover the storage device.

SUMMARY

Some example embodiments are directed to provide an electronic system that is able to recover a storage device in a short time when an error is occurred in the storage device.

Some example embodiments are directed to provide a method of operating the electronic system.

According to at least some example embodiments, a method of operating an electronic system including a host and a storage device includes transmitting a command signal including a time-out time from the host to the storage device; determining, by the storage device, a first time amount, the first time amount being an amount of time required for the storage device to perform an operation corresponding to the command signal; when the first time amount is equal to or shorter than the time-out time included in the command signal, providing a first response signal including a success flag from the storage device to the host after the storage device performs the operation corresponding to the command signal within the time-out time; when the first time amount is longer than the time-out time included in the command signal, providing a second response signal including the first time amount and a time-out reset flag from the storage device to the host; and when the host receives the second response signal from the storage device, retransmitting the command signal from the host to the storage device after the host resets the time-out time included in the command signal to the first time amount included in the second response signal.

According to at least some example embodiments of the inventive concepts, a method of operating an electronic system including a host and a storage device includes scheduling, by the host, a plurality of command signals, each of which includes a time-out time; transmitting a command signal having a highest priority among the scheduled command signals from the host to the storage device; determining, by the storage device, a first time amount required to perform an operation corresponding to the transmitted command signal; when the first time amount is equal to or shorter than the time-out time included in the command signal, providing a first response signal including a success flag from the storage device to the host after the storage device performs the operation corresponding to the command signal within the time-out time; when the first time amount is longer than the time-out time included in the command signal, providing a second response signal including the first time amount and a time-out reset flag from the storage device to the host; and when the host receives the second response signal from the storage device, resetting, by the host, the time-out time included in the command signal to the first time amount included in the second response signal; and rescheduling, by the host, the plurality of command signals based on the first time amount included in the second response signal.

According to at least some example embodiments of the inventive concepts, a method of operating a storage device includes receiving, at the storage device, a command signal including a time-out time and an indication to perform an operation, the command signal being received from a host, the time-out time being an indication of an amount of time the host will wait for a response from the storage device before resending the command signal; determining, at the storage device, a first time amount, the first time amount being an estimate of an amount of time that would elapse between a point in time when the storage device begins performing the operation and a point in time when the storage device completes the operation if the storage device were to perform the operation; deciding, at the storage device, whether to send the determined first time amount to the host, the deciding being based on the time-out time and the determined first time amount; and sending the determined first time amount from the storage device to the host based on the deciding.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 1:
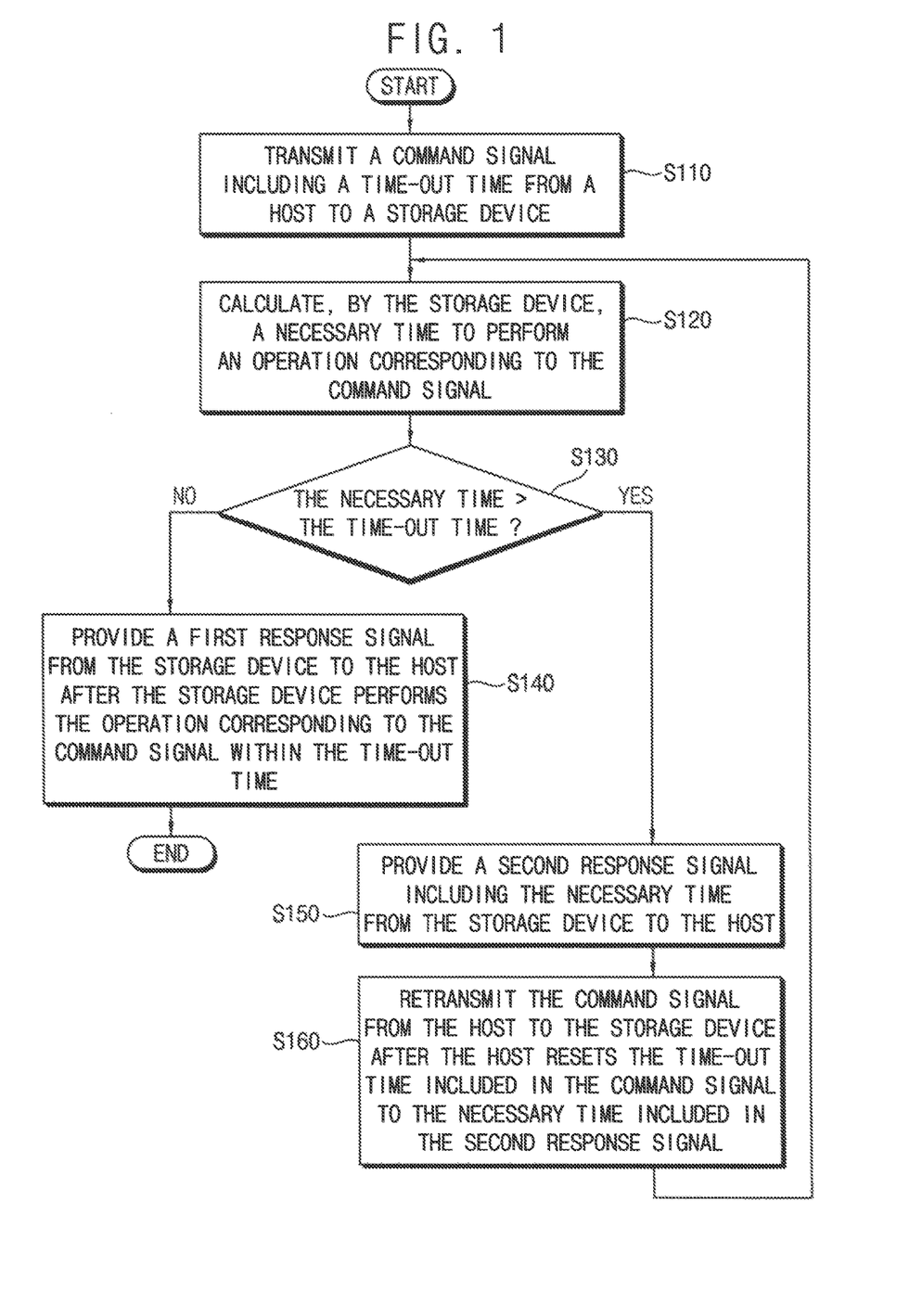
FIG. 1 is a flow chart illustrating a method of operating an electronic system according to example embodiments.

FIG. 1 is a flow chart illustrating a method of operating an electronic system according to example embodiments.

In FIG. 1, a method of operating an electronic system including a host and a storage device is illustrated.

Referring to FIG. 1, the host may transmit a command signal including a time-out time to the storage device (step S110).

The time-out time may represents a desired or, alternatively, maximum time during which the host waits for receiving a response signal, which corresponds to the command signal, from the storage device after the host transmits the command signal to the storage device. According to at least some example embodiments of the inventive concepts, the time-out time may be configurable by a user of the host.

According to at least some example embodiments of the inventive concepts, the time-out time included in the command signal may correspond to a minimum time which is required for the storage device to perform an operation corresponding to the command signal.

The command signal may represent various kinds of commands. For example, the command signal may correspond to a write command, a read command, an erase command, a state inquiry command, etc.

When the storage device receives the command signal from the host, the storage device may calculate a necessary or, alternatively, requested time. According to at least some example embodiments, the necessary or, alternatively, requested time is an estimate of an amount of time required to perform an operation corresponding to the command signal (step S120). Various kinds of methods for the storage device to calculate the necessary or, alternatively, requested time will be described later.

After that, the storage device may compare the necessary or, alternatively, requested time with the time-out time included in the command signal (step S130).

When the necessary or, alternatively, requested time is equal to or shorter than the time-out time included in the command signal (step S130; no), the storage device may provide a first response signal including a success flag to the host after performing the operation corresponding to the command signal within the time-out time (step S140).

On the other hand, when the necessary or, alternatively, requested time is longer than the time-out time included in the command signal (step S130; yes), the storage device may provide a second response signal including the necessary or, alternatively, requested time and a time-out reset flag to the host within the time-out time (step S150). In this case, the host may retransmit the command signal to the storage device after resetting the time-out time included in the command signal to the necessary or, alternatively, requested time included in the second response signal (step S160).

When the storage device receives the command signal including the time-out time, which is reset to the necessary or, alternatively, requested time included in the second response signal, from the host, the storage device may recalculate the necessary or, alternatively, requested time for performing the operation corresponding to the command signal (step S120).

After that, the storage device may compare the necessary or, alternatively, requested time with the time-out time included in the command signal (step S130).

When the necessary or, alternatively, requested time is equal to or shorter than the time-out time included in the command signal (step S130; no), the storage device may provide the first response signal including the success flag to the host after performing the operation corresponding to the command signal within the time-out time (step S140).

On the other hand, when the necessary or, alternatively, requested time is longer than the time-out time included in the command signal (step S130; yes), the storage device may provide the second response signal including the necessary or, alternatively, requested time and the time-out reset flag to the host within the time-out time (step S150). In this case, the host may retransmit the command signal to the storage device after resetting the time-out time included in the command signal to the necessary or, alternatively, requested time included in the second response signal (step S160).

When the host does not receive the first response signal from the storage device although the host retransmits the command signal to the storage device more than a threshold number of times, the host may reset the storage device to recover the storage device and then retransmit the command signal to the storage device such that the storage device may perform the operation corresponding to the command signal.

As described above with reference to FIG. 1, in the method of operating the electronic device, the time-out time included in the command signal may not be fixed but be varied. That is, when the storage device determines that it may not be able to perform the operation corresponding to the command signal within the time-out time included in the command signal, the storage device may calculate the necessary or, alternatively, requested time for performing the operation corresponding to the command signal and provide the necessary or, alternatively, requested time to the host. In this case, the host may reset the time-out time included in the command signal to the necessary or, alternatively, requested time and retransmit the command signal to the storage device.

Therefore, the method of operating the electronic device according to example embodiments may effectively resolve the problem that the storage device may not process the command signal within the time-out time.

Figure 2:
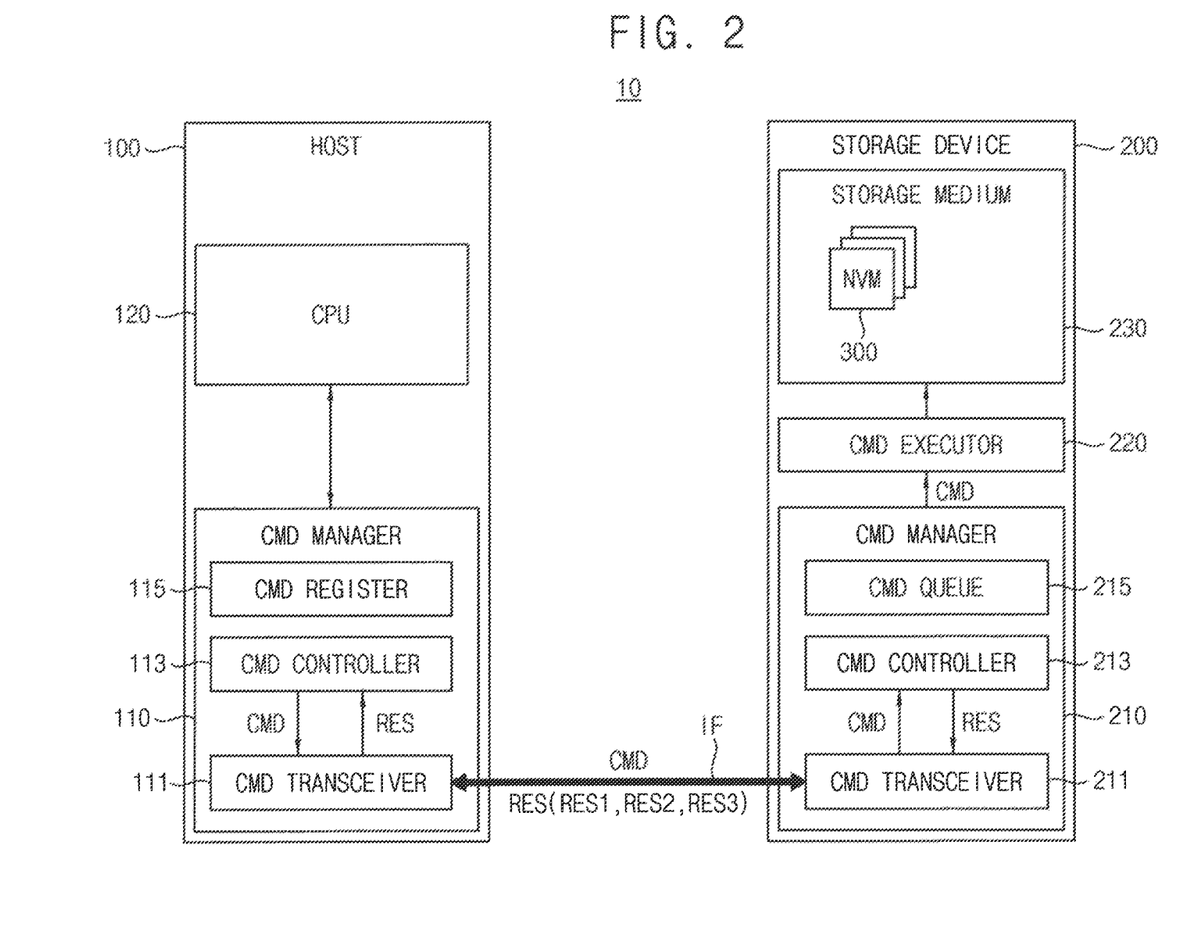
FIG. 2 is a block diagram illustrating an electronic system according to example embodiments.

FIG. 2 is a block diagram illustrating an electronic system according to example embodiments.

The method of operating the electronic system of FIG. 1 may be performed by an electronic system 10 of FIG. 2.

Hereinafter, the method of operating the electronic system 10 will be described with reference to FIGS. 1 and 2.

The electronic system 10 may include a host 100 and a storage device 200.

The host 100 and the storage device 200 may be connected to each other through an interface IF.

The host 100 may include a command manager 110 and a central processing unit (CPU) 120.

The command manager 110 may control an operation of the storage device 200 by transmitting a command signal CMD to the storage device 200 through the interface IF under a control of the CPU 120.

According to at least one example embodiment of the inventive concepts, the command manager 110 may include or be implemented by one or more circuits or circuitry (e.g., hardware) specifically structured to carry out and/or control some or all of the operations described in the present disclosure as being performed by the command manager 110 (or an element thereof). According to at least one example embodiment of the inventive concepts, the command manager 110 may include or be implemented by a memory and one or more processors executing computer-readable code (e.g., software and/or firmware) that is stored in the memory and includes instructions for causing the one or more processors to carry out and/or control some or all of the operations described herein as being performed by the command manager 110 (or an element thereof). According to at least one example embodiment of the inventive concepts, the command manager 110 may be implemented by, for example, a combination of the above-referenced hardware and processors executing computer-readable code.

The storage device 200 may include a command manager 210, a command executor 220, and a storage medium 230.

The command manager 210 of the storage device 200 may receive the command signal CMD from the command manager 110 of the host 100 through the interface IF.

The command manager 210 may consecutively provide the command signal CMD, which is received from the host 100, to the command executor 220, and the command executor 220 may perform the operation corresponding to the command signal on the storage medium 230.

The host 100 may further transmit an address signal together with the command signal CMD to the storage device 200. In this case, the command executor 220 may perform the operation corresponding to the command signal on a storage area corresponding to the address signal among the storage areas of the storage medium 230.

According to at least some example embodiments of the inventive concepts, either or both of the command manager 210 and a command executor 220 may be implemented by hardware, processors executing computer-readable code, or a combination of hardware and processors executing computer-readable code, for example, in the manner discussed above with respect to the command manager 110. According to at least some example embodiments of the inventive concepts, the storage device 200 may correspond to a universal flash storage (UFS) device. In this case, the storage medium 230 may include a plurality of nonvolatile memory devices NVM 300.

Figure 3:
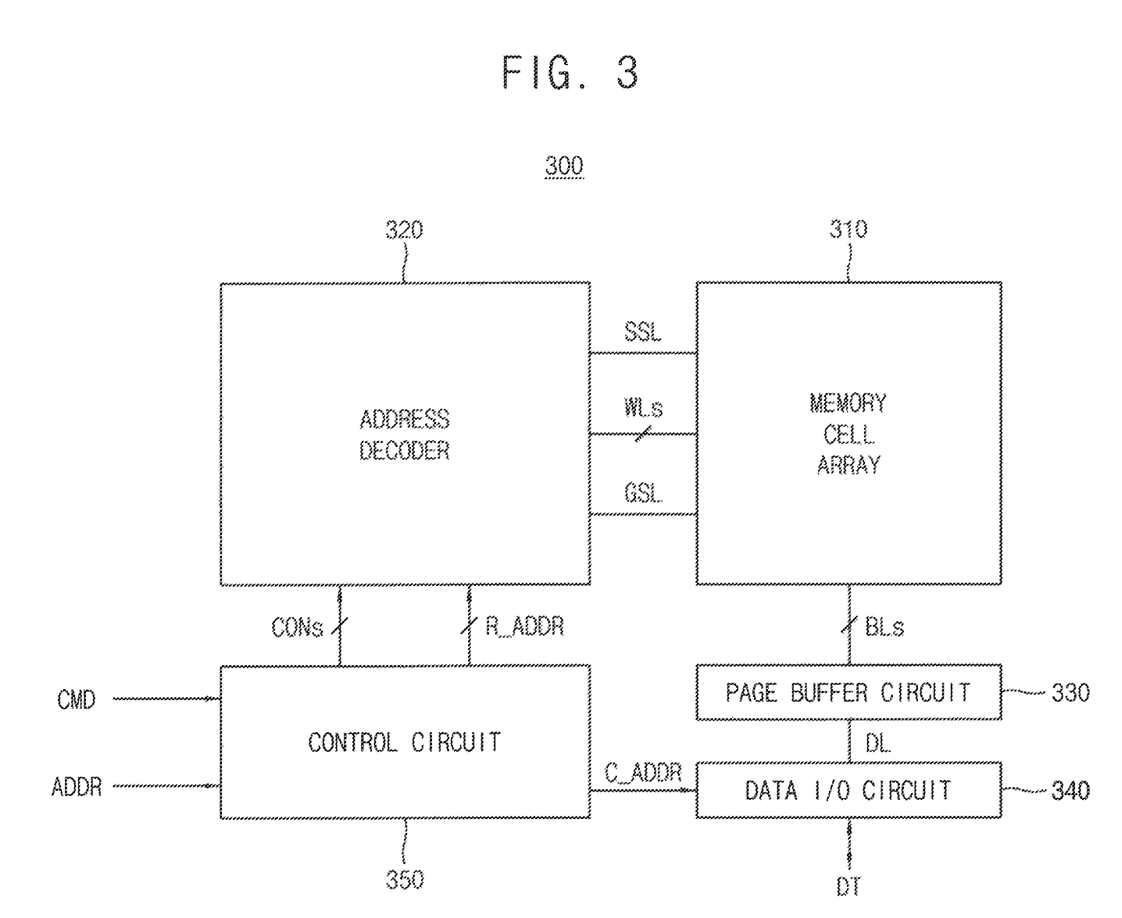
FIG. 3 is a block diagram illustrating an example of a nonvolatile memory device included in a storage device of FIG. 2.

FIG. 3 is a block diagram illustrating an example of a nonvolatile memory device included in a storage device of FIG. 2.

Each of the plurality of nonvolatile memory devices 300 included in the storage device 200 of FIG. 2 may be implemented with a nonvolatile memory device 300 of FIG. 3.

Referring to FIG. 3, the nonvolatile memory device 300 may include a memory cell array 310, an address decoder 320, a page buffer circuit 330, a data input/output circuit 340, and control circuit 350.

The memory cell array 310 may be coupled to the address decoder 320 through a string selection line SSL, a plurality of word lines WLs, and a ground selection line GSL. In addition, the memory cell array 310 may be coupled to the page buffer circuit 330 through a plurality of bit lines BLs.

The memory cell array 310 may include a plurality of memory cells coupled to the plurality of word lines WLs and the plurality of bit lines BLs.

According to at least some example embodiments of the inventive concepts, the memory cell array 310 may be a three-dimensional memory cell array, which is formed on a substrate in a three-dimensional structure (or a vertical structure). In this case, the memory cell array 310 may include vertical cell strings that are vertically oriented such that at least one memory cell is located over another memory cell. The following patent documents, which are hereby incorporated by reference, describe suitable configurations for three-dimensional memory cell arrays: U.S. Pat. Nos. 7,679,133; 8,553,466; 8,654,587; 8,559,235; and US Pat. Pub. No. 2011/0233648.

In other example embodiments, the memory cell array 310 may be a two-dimensional memory cell array, which is formed on a substrate in a two-dimensional structure (or a horizontal structure).

Figure 4:
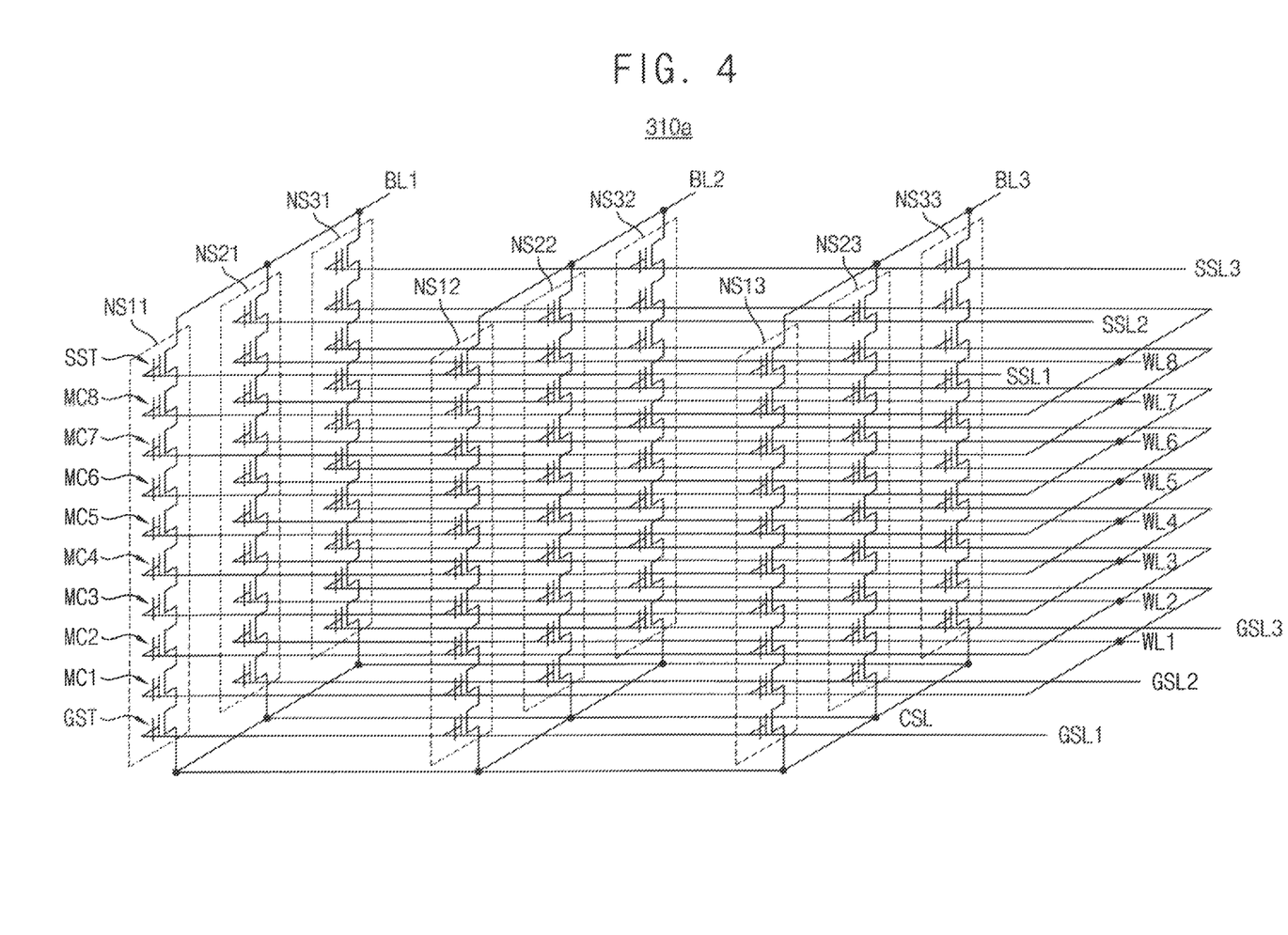
FIG. 4 is a circuit diagrams illustrating an example of a memory cell array included in the nonvolatile memory device of FIG. 3.

FIG. 4 is a circuit diagram illustrating an example of a memory cell array included in the nonvolatile memory device of FIG. 3.

A memory cell array 310a of FIG. 4 may be formed on a substrate in a three-dimensional structure (or a vertical structure). For example, a plurality of memory cell strings included in the memory cell array 310a may be formed in a direction perpendicular to the substrate.

Referring to FIG. 4, the memory cell array 310a may include memory cell strings NS11 to NS33 coupled between bit lines BL1, BL2 and BL3 and a common source line CSL. Each of the memory cell strings NS11 to NS33 may include a string selection transistor SST, a plurality of memory cells MC1 to MC8, and a ground selection transistor GST.

In FIG. 4, each of the memory cell strings NS11 to NS33 is illustrated to include eight memory cells MC1 to MC8.

However, example embodiments are not limited thereto. According to at least some example embodiments of the inventive concepts, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word lines WL1 to WL8, respectively. The ground selection transistor GST may be connected to corresponding ground selection lines GSL1 to GSL3. The string selection transistor SST may be connected to corresponding bit lines BL1, BL2 and BL3, and the ground selection transistor GST may be connected to the common source line CSL.

Word lines (e.g., WL1) having the same height may be commonly connected, and the ground selection lines GSL1 to GSL3 and the string selection lines SSL1 to SSL3 may be separated.

In FIG. 4, the memory cell array 310a is illustrated to be coupled to eight word lines WL1 to WL8 and three bit lines BL1 to BL3. However, example embodiments are not limited thereto. According to at least some example embodiments of the inventive concepts, the memory cell array 310a may be coupled to any number of world lines and bit lines.

Referring again to FIG. 3, the control circuit 350 may receive the command signal CMD and the address signal ADDR, and control a program operation, a read operation, and an erase operation of the nonvolatile memory device 300 based on the command signal CMD and the address signal ADDR.

For example, the control circuit 350 may generate control signals CONs based on the command signal CMD, and generate a row address R_ADDR and a column address C_ADDR based on the address signal ADDR. The control circuit 350 may provide the control signals CONs and the row address R_ADDR to the address decoder 320 and provide the column address C_ADDR to the data input/output circuit 340.

The address decoder 320 may be coupled to the memory cell array 310 through the string selection line SSL, the plurality of word lines WLs, and the ground selection line GSL.

The address decoder 320 may perform the program operation, the read operation, and the erase operation by applying an operation voltage to the plurality of word lines WLs based on the control signals CONs and the row address R_ADDR.

The page buffer circuit 330 may be coupled to the memory cell array 310 through the plurality of bit lines BLs.

The page buffer circuit 330 may include a plurality of page buffers. According to at least some example embodiments of the inventive concepts, one page buffer may be connected to one bit line. In other example embodiments, one page buffer may be connected to two or more bit lines.

The page buffer circuit 330 may temporarily store data to be programmed in a selected page or data read out from the selected page.

The data input/output circuit 340 may be coupled to the page buffer circuit 330 through data lines DL.

During the program operation, the data input/output circuit 340 may receive program data DT from the host 100 and provide the program data DT to the page buffer circuit 330 based on the column address C_ADDR received from the control circuit 350.

During the read operation, the data input/output circuit 340 may provide read data DT, which are stored in the page buffer circuit 330, to the host 100 based on the column address C_ADDR received from the control circuit 350.

Hereinbefore, an example of the plurality of nonvolatile memory devices 300 included in the storage device 200 is described with reference to FIGS. 2 and 3. However, example embodiments are not limited thereto. According to example embodiments, each of the plurality of nonvolatile memory devices 300 may be implemented in different structures.

Referring again to FIG. 2, the command manager 110 of the host 100 may include a command transceiver 111 and a command controller 113. The command manager 210 of the storage device 200 may include a command transceiver 211 and a command controller 213.

The command controller 113 may generate the command signal CMD including the time-out time and provide the command signal CMD to the command transceiver 111. The command transceiver 111 may transmit the command signal CMD to the command transceiver 211 of the storage device 200 through the interface IF (step S110).

Figure 5:
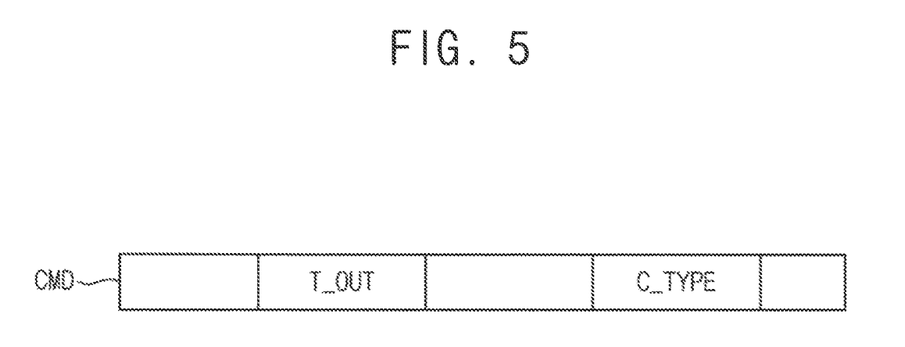
FIG. 5 is a diagram illustrating an example of a command signal transmitted from a host to the storage device in the electronic system of FIG. 1.

FIG. 5 is a diagram illustrating an example of a command signal transmitted from a host to the storage device in the electronic system of FIG. 1.

Referring to FIG. 5, the command signal CMD may include the time-out time T_OUT and a command type C_TYPE.

As described above, the time-out time T_OUT may represent the desired or, alternative, maximum time during which the host 100 waits for receiving the response signal RES, which corresponds to the command signal CMD, from the storage device 200 after the host 100 transmits the command signal CMD to the storage device 200. The command type C_TYPE may represent a kind of a command of the command signal CMD. For example, the command type C_TYPE may represent a write command, a read command, an erase command, a state inquiry command, etc. According to at least some example embodiments of the inventive concepts, the time-out time may be configurable by a user of the host.

Referring again to FIG. 2, the command transceiver 211 of the storage device 200 may provide the command signal CMD received from the command transceiver 111 of the host 100 to the command controller 213. The command controller 213 may calculate the necessary or, alternatively, requested time. According to at least some example embodiments, the necessary or, alternatively, requested time is an estimate of the amount of time it will take for the storage device 200 to perform the operation corresponding to the command signal CMD (step S120). According to at least some example embodiments, the storage device 200 or the command controller 213 may store a default value for the necessary or, alternatively, requested time, and calculate the necessary or, alternatively, requested time by increasing or decreasing the default value based on one or more factors, examples of which are discussed below. According to at least some example embodiments, the default value may be set, for example, based on the preferences of a user and/or designer of the storage device 200.

According to at least some example embodiments of the inventive concepts, the command controller 213 may calculate the necessary or, alternatively, requested time for performing the operation corresponding to the command signal CMD based on a kind of the command signal CMD. For example, when the command type C_TYPE included in the command signal CMD represents the write command, which accompanies a program operation on the storage medium 230, the command controller 213 may increase the necessary or, alternatively, requested time. On the other hand, when the command type C_TYPE included in the command signal CMD represents the state inquiry command, which is used to check a state of the storage device 200, the command controller 213 may decrease the necessary or, alternatively, requested time.

According to at least some example embodiments of the inventive concepts, the command controller 213 may calculate the necessary or, alternatively, requested time for the storage device 200 to perform the operation corresponding to the command signal CMD based on a size of a storage area among the storage areas of the storage medium 230 on which the operation corresponding to the command signal CMD is performed. For example, the command controller 213 may increase the necessary or, alternatively, requested time as the size of the storage area on which the operation corresponding to the command signal CMD is performed increases. On the other hand, the command controller 213 may decrease the necessary or, alternatively, requested time as the size of the storage area on which the operation corresponding to the command signal CMD is performed decreases.

According to at least some example embodiments of the inventive concepts, the command controller 213 may calculate the necessary or, alternatively, requested time for performing the operation corresponding to the command signal CMD based on an internal operation state of the storage device 200. For example, the command controller 213 may increase the necessary or, alternatively, requested time when the storage device 200 receives the command signal CMD from the host 100 while internally performing a garbage collection operation. On the other hand, the command controller 213 may decrease the necessary or, alternatively, requested time when the storage device 200 is in an idle state.

According to at least some example embodiments of the inventive concepts, the command controller 213 may calculate the necessary or, alternatively, requested time for the storage device 200 to perform the operation corresponding to the command signal CMD based on an operation speed of the interface IF connecting the storage device 200 to the host 100. For example, the command controller 213 may increase the necessary or, alternatively, requested time when the operation speed of the interface IF decreases. On the other hand, the command controller 213 may decrease the necessary or, alternatively, requested time when the operation speed of the interface IF increases.

According to at least some example embodiments of the inventive concepts, as illustrated in FIG. 2, the command manager 210 of the storage device 200 may further include a command queue 215. In this case, the command transceiver 211 may consecutively store the command signal CMD received from the host 100 in the command queue 215, and the command controller 213 may consecutively provide the command signal CMD stored in the command queue 215 to the command executor 220.

In this case, the command controller 213 may calculate the necessary or, alternatively, requested time for the storage device 200 to perform the operation corresponding to the command signal CMD based on a state of the command queue 215. For example, the command controller 213 may increase the necessary or, alternatively, requested time when the number of the command signals CMD stored in the command queue 215 increases. On the other hand, the command controller 213 may decrease the necessary or, alternatively, requested time when the number of the command signals CMD stored in the command queue 215 decreases.

After that, the command controller 213 may compare the necessary or, alternatively, requested time with the time-out time T_OUT included in the command signal CMD (step S130).

When the necessary or, alternatively, requested time is equal to or shorter than the time-out time T_OUT included in the command signal CMD (step S130; no), the command controller 213 may store the command signal CMD in the command queue 215, and consecutively provide the command signal CMD stored in the command queue 215 to the command executor 220. The command executor 220 may perform the operation corresponding to the command signal CMD on the storage medium 230, the command controller 213 may provide the first response signal RES1 including the success flag to the command transceiver 211, and the command transceiver 211 may transmit the first response signal RES1 including the success flag to the host 100 (step S140).

On the other hand, when the necessary or, alternatively, requested time is longer than the time-out time T_OUT included in the command signal CMD (step S130; yes), the command controller 213 may not store the command signal CMD in the command queue 215. Instead, the command controller 213 may provide the second response signal RES2 including the necessary or, alternatively, requested time and the time-out reset flag to the command transceiver 211, and the command transceiver 211 may transmit the second response signal RES2 including the necessary or, alternatively, requested time and the time-out reset flag to the host 100 (step S150).

Figure 6:
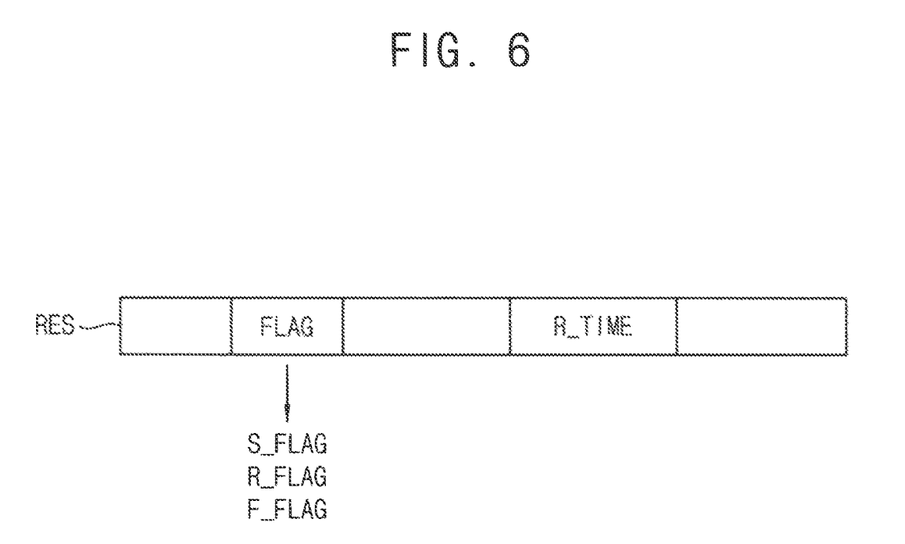
FIG. 6 is a diagram illustrating an example of a response signal transmitted from a storage device to the host in the electronic system of FIG. 1.

FIG. 6 is a diagram illustrating an example of a response signal transmitted from a storage device to the host in the electronic system of FIG. 1.

Referring to FIG. 6, the response signal RES may include a response flag FLAG and the necessary or, alternatively, requested time R_TIME.

When the response flag FLAG is the success flag S_FLAG, the response signal RES may be provided to the host 100 as the first response signal RES1.

When the response flag FLAG is the time-out reset flag R_FLAG, the response signal RES may be provided to the host 100 as the second response signal RES2. As described above, the second response signal RES2 may further include the necessary or, alternatively, requested time R_TIME.

If the storage device 200 is not able to perform the operation corresponding to the command signal CMD, the command controller 213 may generate a third response signal RES3 in which the response flag FLAG is the failure flag F_FLAG, and the command transceiver 211 may transmit the third response signal RES3 to the host 100.

Referring again to FIG. 2, the command transceiver 111 of the host 100 may provide the second response signal RES2 to the command controller 113, the command controller 113 may reset the time-out time T_OUT included in the command signal CMD to the necessary or, alternatively, requested time R_TIME included in the second response signal RES2, and then provide the command signal CMD to the command transceiver 111, and the command transceiver 111 may retransmit the command signal CMD to the storage device 200 (step S160).

Figure 7:
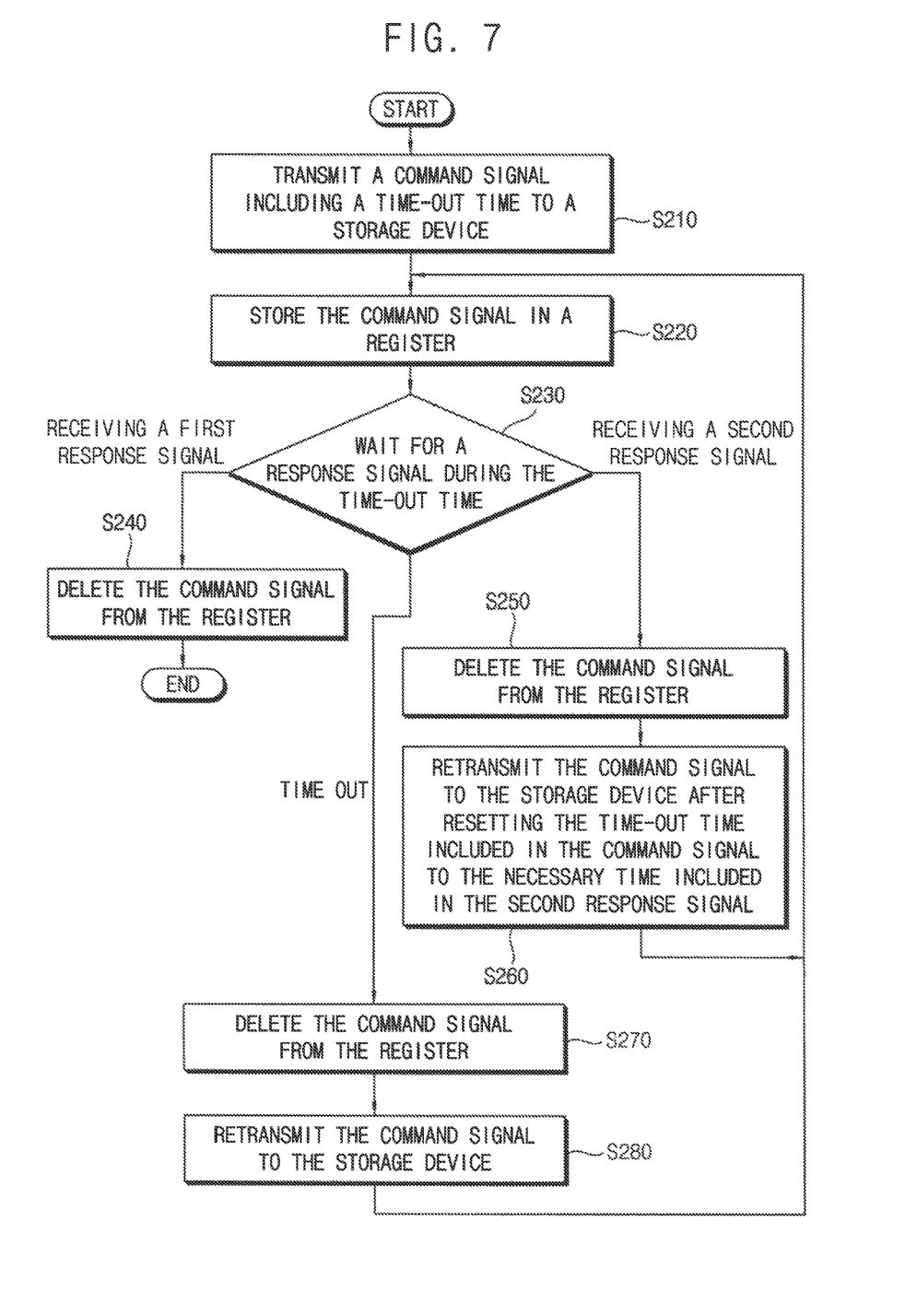
FIG. 7 is a flow chart illustrating an example of an operation of a host according to the method of operating an electronic system of FIG. 1.

FIG. 7 is a flow chart illustrating an example of an operation of a host according to the method of operating an electronic system of FIG. 1.

As illustrated in FIG. 2, the command manager 110 of the host 100 may further include a command register 115.

In this case, referring to FIG. 7, the host 100 may transmit the command signal CMD to the storage device 200 through the command transceiver 111 (step S210), and store the command signal CMD in the command register 115 (step S220).

After that, the host 100 may wait for receiving the response signal RES from the storage device 200 during the time-out time T_OUT included in the command signal CMD (step S230).

When the host 100 receives the first response signal RES1 from the storage device 200 within the time-out time T_OUT, the host 100 may determine that the storage device 200 has performed the operation corresponding to the command signal CMD correctly, and delete the command signal CMD from the command register 115 (step S240).

When the host 100 receives the second response signal RES2 from the storage device 200 within the time-out time T_OUT, the host 100 may determine that the storage device 200 requires more time than the time-out time T_OUT to perform the operation corresponding to the command signal CMD. In this case, the host 100 may delete the command signal CMD from the command register 115 (step S250), retransmit the command signal CMD to the storage device 200 after resetting the time-out time T_OUT included in the command signal CMD to the necessary or, alternatively, requested time R_TIME included in the second response signal RES2 (step S260), and store the command signal CMD in the command register 115 (step S220).

When the host 100 does not receive the response signal RES from the storage device 200 within the time-out time T_OUT, the host 100 may delete the command signal CMD from the command register 115 (step S270), retransmit the command signal CMD to the storage device 200 (step S280), and restore the command signal CMD in the command register 115 (step S220).

When the host 100 does not receive the response signal RES from the storage device 200 although the host 100 retransmits the command signal CMD to the storage device 200 more than the threshold number of times, the host 100 may reset the storage device 200 to recover the storage device 200 and then retransmit the command signal CMD to the storage device 200 such that the storage device 200 may perform the operation corresponding to the command signal CMD.

Figure 8:
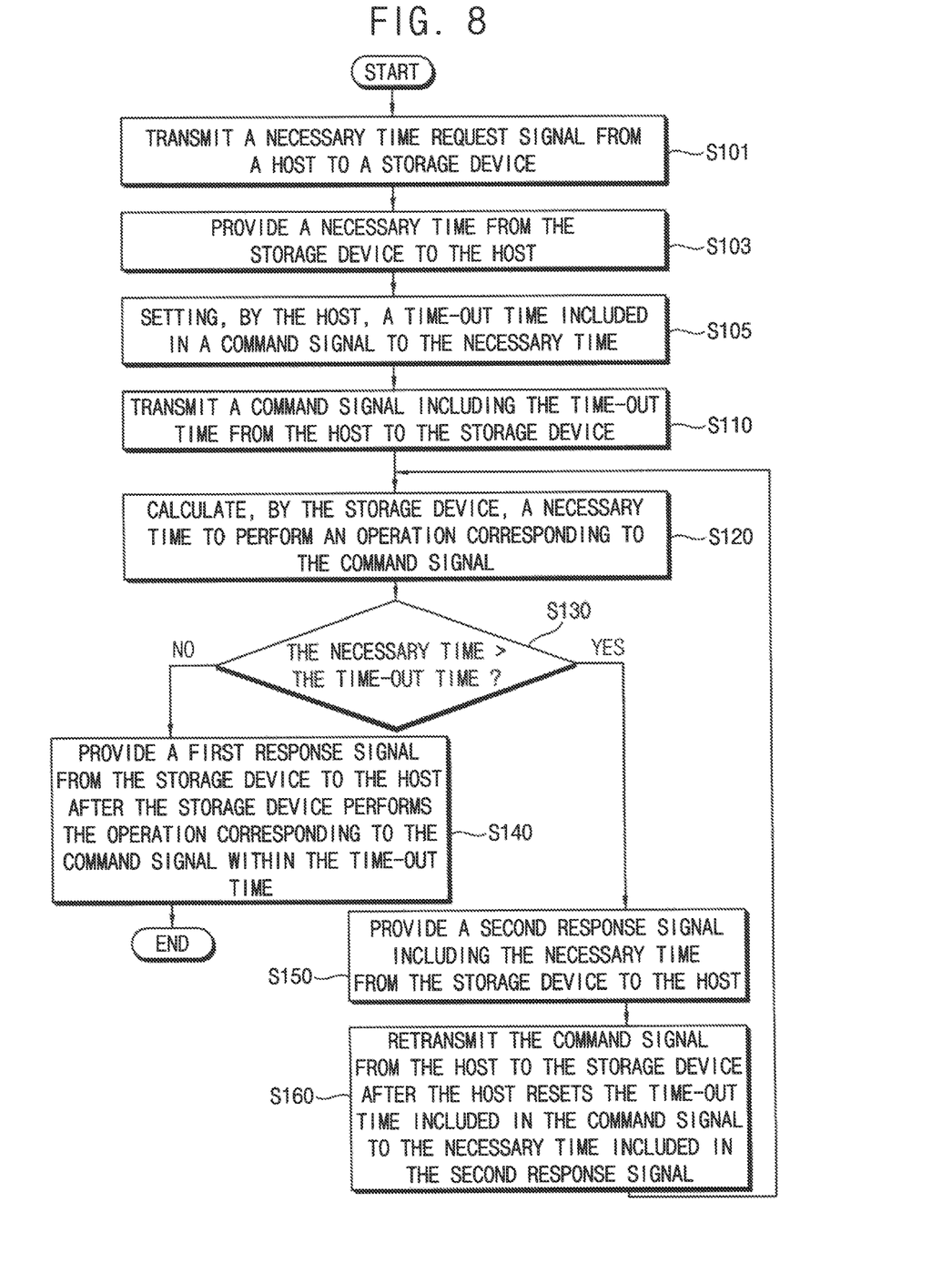
FIG. 8 is a flow chart illustrating an example of the method of operating an electronic system of FIG. 1.

FIG. 8 is a flow chart illustrating an example of the method of operating an electronic system of FIG. 1.

Referring to FIG. 8, before the host 100 transmits the command signal CMD to the storage device 200, the host 100 may transmit a necessary time request signal to the storage device 200 (step S101).

In this case, the storage device 200 may provide a necessary or, alternatively, requested time to the host 100 in response to the necessary time request signal (step S103). According to at least some example embodiments, the necessary or, alternatively, requested time is an estimate of the amount of time it will take for the storage device 200 to perform the operation corresponding to a command signal CMD received from the host 100. According to at least some example embodiments, the storage device 200 or the command controller 213 may store a default value for the necessary or, alternatively, requested time, and calculate the necessary or, alternatively, requested time provided in step S103 by increasing or decreasing the default value based on one or more factors, including, for example, an internal operation state of the storage device 200 when the storage device receives the necessary time request signal. According to at least some example embodiments, the default value may be set, for example, based on the preferences of a user and/or designer of the storage device 200.

The host 100 may set the time-out time T_OUT included in the command signal CMD to the necessary or, alternatively, requested time (step S105).

After that, the host 100 may transmit the command signal CMD including the time-out time T_OUT, which is reset to the necessary or, alternatively, requested time provided in step S103, to the storage device 200 (step S110).

As illustrated in FIG. 8, operations performed after the step S110 may be the same as the method of operating the electronic system of FIG. 1. Therefore, duplicated descriptions will be omitted.

As described above with reference to FIGS. 1 to 8, in the method of operating the electronic device according to example embodiments, the time-out time T_OUT included in the command signal CMD, which is transmitted from the host 100 to the storage device 200 at the first time, may be set to the necessary or, alternatively, requested time provided in step S103, which corresponds to the minimum time required for the storage device 200 to perform the operation corresponding to the command signal CMD received from the host 100.

Therefore, although an error is occurred in the storage device 200 such that the storage device 200 may not perform the operation corresponding to the command signal CMD, the host 100 may reset the storage device 200 to recover the storage device 200 after waiting for the response signal RES during the threshold number of times of the minimum necessary or, alternatively, requested time.

As such, the method of operating the electronic device according to example embodiments may recover the storage device 200 in a short time when an error is occurred in the storage device 200.

In addition, in the method of operating the electronic device, the time-out time T_OUT included in the command signal CMD may not be fixed but be varied. That is, when the storage device 200 determines that it may not be able to perform the operation corresponding to the command signal CMD within the time-out time T_OUT included in the command signal CMD, the storage device 200 may calculate the necessary or, alternatively, requested time R_TIME for the storage device 200 to perform the operation corresponding to the command signal CMD and provide the necessary or, alternatively, requested time R_TIME to the host 100. In this case, the host 100 may reset the time-out time T_OUT included in the command signal CMD to the necessary or, alternatively, requested time R_TIME and retransmit the command signal CMD to the storage device 200.

Therefore, since the storage device 200 provides the necessary or, alternatively, requested time R_TIME to the host 100 through the second response signal RES2 although the storage device 200 is not able to perform the operation corresponding to the command signal CMD within the time-out time T_OUT, the host 100 may not receive the response signal RES from the storage device 200 in duplicate for the retransmitted command signal CMD. Therefore, the method of operating the electronic device according to example embodiments may effectively prevent a malfunction of the host 100.

According to at least some example embodiments of the inventive concepts, the host 100 may transmit an operation mode request signal to the storage device 200 at an initial stage of a power-up. In this case, the storage device 200 may provide an operation mode signal, which represents whether the storage device 200 operates in a first operation mode in which the storage device 200 provides the second response signal RES2 including the necessary or, alternatively, requested time R_TIME to the host 100 or in a second operation mode in which the storage device 200 does not provide the second response signal RES2 to the host 100, to the host 100 in response to the operation mode request signal.

That is, when the storage device 200 operates in the second operation mode, the storage device 200 does not provide the second response signal RES2 to the host 100 although the storage device 200 is not able to perform the operation corresponding to the command signal CMD within the time-out time T_OUT.

In this case, the host 100 may perform the operations of FIG. 8 only when the storage device 200 operates in the first operation mode.

On the other hand, when the storage device 200 operates in the second operation mode, the host 100 may fix the time-out time T_OUT included in the command signal CMD to a first time longer than the necessary or, alternatively, requested time. Therefore, the time-out time T_OUT included in all of the command signals CMD transmitted from the host 100 to the storage device 200 may be set to the first time.

Figure 9:
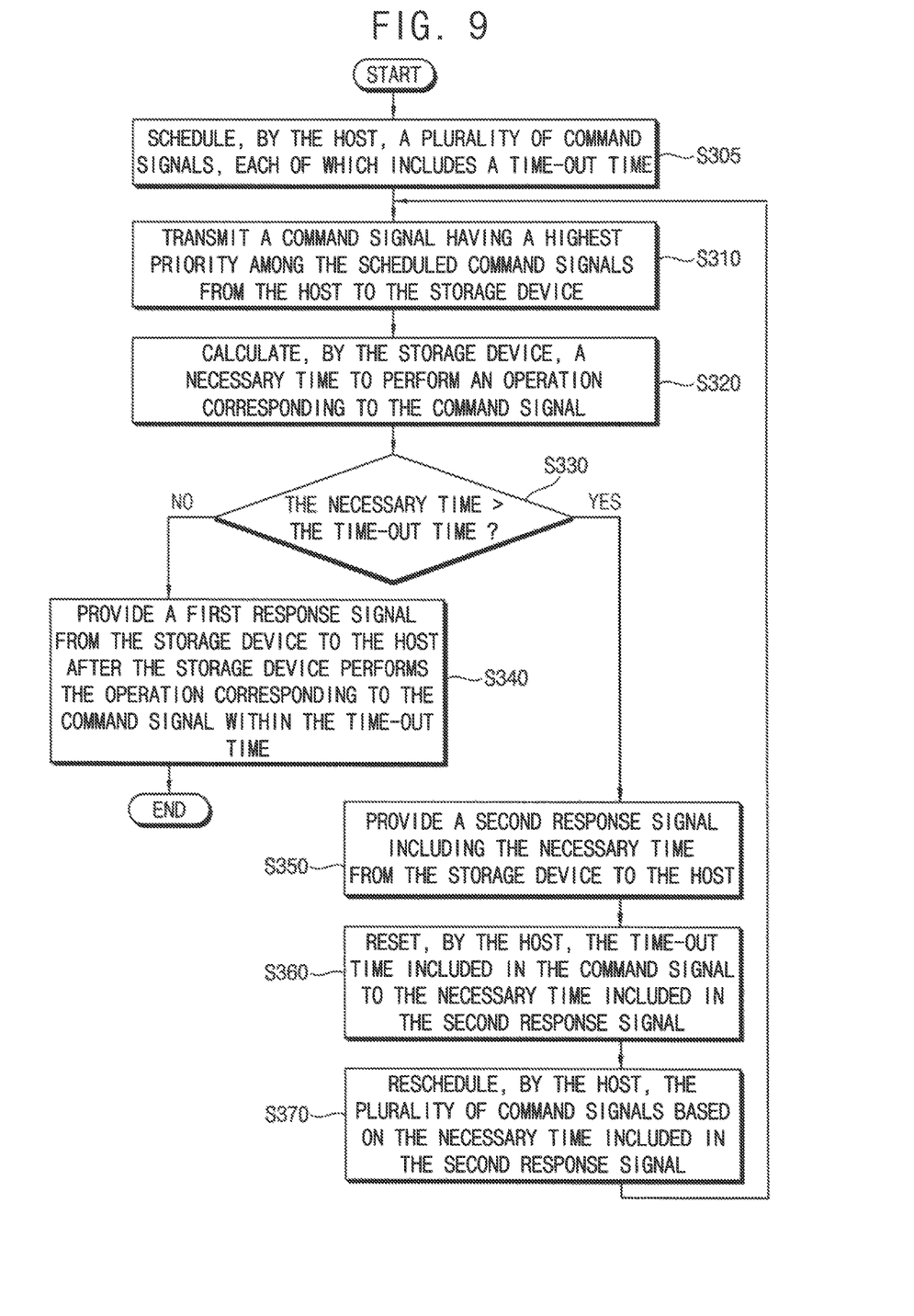
FIG. 9 is a flow chart illustrating a method of operating an electronic system according to example embodiments.

FIG. 9 is a flow chart illustrating a method of operating an electronic system according to example embodiments.

The method of operating the electronic system of FIG. 9 may be performed by the electronic system 10 of FIG. 2.

Referring to FIGS. 2 and 9, the host 100 may schedule a plurality of command signals CMD, each of which includes the time-out time T_OUT (step S305).

After that, the host 100 may transmit a command signal CMD having a highest priority among the scheduled command signals CMD to the storage device 200 (step S310).

The storage device 200 may calculate the necessary or, alternatively, requested time R_TIME for the storage device 200 to perform the operation corresponding to the command signal CMD (step S320), and compare the necessary or, alternatively, requested time R_TIME with the time-out time T_OUT included in the command signal CMD (step S330). According to at least some example embodiments, the storage device 200 or the command controller 213 may store a default value for the necessary or, alternatively, requested time, and calculate the necessary or, alternatively, requested time by increasing or decreasing the default value based on one or more factors, examples of which are discussed above with reference to FIG. 1. According to at least some example embodiments, the default value may be set, for example, based on the preferences of a user and/or designer of the storage device 200.

When the necessary or, alternatively, requested time R_TIME is equal to or shorter than the time-out time T_OUT included in the command signal CMD (step S330; no), the storage device 200 may provide the first response signal RES1 including the success flag S_FLAG to the host 100 after performing the operation corresponding to the command signal CMD within the time-out time T_OUT (step S340).

On the other hand, when the necessary or, alternatively, requested time R_TIME is longer than the time-out time T_OUT included in the command signal CMD (step S330; yes), the storage device 200 may provide the second response signal RES2 including the necessary or, alternatively, requested time R_TIME and the time-out reset flag R_FLAG to the host 100 within the time-out time T_OUT (step S350). In this case, the host 100 may reset the time-out time T_OUT included in the command signal CMD to the necessary or, alternatively, requested time R_TIME included in the second response signal RES2 (step S360).

After that, the host 100 may reschedule the plurality of command signals CMD based on the necessary or, alternatively, requested time R_TIME included in the second response signal RES2 (step S370).

For example, the host 100 may decrease a priority of the command signal CMD as the necessary or, alternatively, requested time R_TIME included in the second response signal RES2, which corresponds to the command signal CMD, increases.

According to at least some example embodiments of the inventive concepts, the host 100 may reschedule the plurality of command signals CMD by comparing the time-out times T_OUT included in the plurality of command signals CMD.

After the host 100 reschedules the plurality of command signals CMD, the host 100 may transmit a command signal CMD having a highest priority among the rescheduled command signals CMD to the storage device 200 (step S310).

As described above with reference to FIG. 9, in the method of operating the electronic device, the storage device 200 may provide the necessary or, alternatively, requested time R_TIME to the host 100 through the second response signal RES2 when the storage device 200 is not able to perform the operation corresponding to the command signal CMD within the time-out time T_OUT.

Since the host 100 reschedules the plurality of command signals CMD based on the necessary or, alternatively, requested time R_TIME provided by the storage device 200, the plurality of command signals CMD may be processed effectively.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:
1. A method of operating an electronic system including a host and a storage device, the method comprising:
    transmitting a command signal including a time-out time from the host to the storage device;
    determining, by the storage device, a first time amount, the first time amount being an amount of time required for the storage device to perform an operation corresponding to the command signal;
    when the first time amount is equal to or shorter than the time-out time included in the command signal,
        providing a first response signal including a success flag from the storage device to the host after the storage device performs the operation corresponding to the command signal within the time-out time;
    when the first time amount is longer than the time-out time included in the command signal,
        providing a second response signal including the first time amount and a time-out reset flag from the storage device to the host; and
    when the host receives the second response signal from the storage device,
        retransmitting the command signal from the host to the storage device after the host resets the time-out time included in the command signal to the first time amount included in the second response signal.

2. The method of claim 1, wherein the determining includes determining, by the storage device, the first time amount based on a command type of the command signal.

3. The method of claim 1, wherein the determining includes determining, by the storage device, the first time amount based on a size of a storage area on which the operation corresponding to the command signal is performed.

4. The method of claim 1, wherein the determining includes determining, by the storage device, the first time amount based on an internal operation state of the storage device.

5. The method of claim 4, wherein the determining the first time amount based on an internal operation state of the storage device includes increasing the first time amount when the storage device receives the command signal from the host while the storage device is performing an internal garbage collection operation.

6. The method of claim 1, wherein the determining includes determining, by the storage device, the first time amount based on an operation speed of an interface connecting the storage device to the host.

7. The method of claim 1, further comprising:
storing, by the storage device, the command signal received from the host in a command queue; and
consecutively processing, by the storage device, the command signals stored in the command queue,
wherein the determining includes determining, by the storage device, the first time amount based on a state of the command queue.

8. The method of claim 1, further comprising:
when the storage device receives the command signal including the time-out time, which is reset to the first time amount included in the second response signal, from the host,
determining, by the storage device, a second time amount, the second time amount being an amount of time required for the storage device to perform an operation corresponding to the command signal that includes the reset time-out time;
providing the first response signal including the success flag from the storage device to the host after the storage device performs the operation corresponding to the command signal within the reset time-out time when the second time amount is equal to or shorter than the reset time-out time included in the command signal;
providing the second response signal including the second time amount and the time-out reset flag from the storage device to the host when the second time amount is longer than the reset time-out time included in the command signal; and
retransmitting the command signal from the host to the storage device after the host resets the reset time-out time included in the command signal to the second time amount included in the second response signal.

9. The method of claim 1, further comprising:
storing, by the host, the command signal in a register when the host transmits the command signal to the storage device;
deleting, by the host, the command signal from the register when the host receives the first response signal from the storage device; and
when the host receives the second response signal from the storage device, deleting, by the host, the command signal from the register,
wherein the resetting of the time-out time includes performing, by the host, the resetting of the time-out time included in the command signal to the first time amount,
wherein in the retransmitting of the command signal includes, when the host receives the second response signal from the storage device,
performing, by the host, the retransmitting of the command signal to the storage device, and
storing, by the host, the retransmitted command signal in the register.

10. The method of claim 9, further comprising:
when an amount of time that has elapsed from a point in time at which the host transmitted the command signal to the storage device exceeds a value of the time-out time before the resetting of the time-out time, and the host has received neither the first response signal nor the second response signal,
deleting, by the host, the command signal from the register,
retransmitting, by the host, the command signal to the storage device, and
storing, by the host, the command signal in the register.

11. The method of claim 10, further comprising:
when a number of times the host has retransmitted the command signal to the storage device exceeds threshold number of times,
resetting, by the host, the storage device and then retransmitting, by the host, the command signal to the storage device.

12. The method of claim 1, further comprising:
transmitting a time request signal from the host to the storage device before transmitting the command signal from the host to the storage device;
providing a first time amount from the storage device to the host in response to the time request signal; and
setting, by the host, the time-out time included in the command signal to the first time amount that was provided in response to the time request signal.

13. The method of claim 12, wherein the first time amount is an amount of time required for the storage device to perform an operation corresponding to the command signal.

14. The method of claim 12, further comprising:
transmitting an operation mode request signal from the host to the storage device;
providing an operation mode signal, which represents whether the storage device operates in a first operation mode in which the storage device provides the second response signal to the host or in a second operation mode in which the storage device does not provide the second response signal to the host, from the storage device to the host in response to the operation mode request signal; and
transmitting the time request signal from the host to the storage device only when the storage device operates in the first operation mode.

15. The method of claim 14, further comprising:
setting, by the host, the time-out time included in the command signal to be longer than the first time amount when the storage device operates in the second operation mode.

16. A method of operating an electronic system including a host and a storage device, the method comprising:
scheduling, by the host, a plurality of command signals, each of which includes a time-out time;

transmitting a command signal having a highest priority among the scheduled command signals from the host to the storage device;

determining, by the storage device, a first time amount required to perform an operation corresponding to the transmitted command signal;

when the first time amount is equal to or shorter than the time-out time included in the command signal,
    providing a first response signal including a success flag from the storage device to the host after the storage device performs the operation corresponding to the command signal within the time-out time;

when the first time amount is longer than the time-out time included in the command signal,
    providing a second response signal including the first time amount and a time-out reset flag from the storage device to the host; and when the host receives the second response signal from the storage device,
    resetting, by the host, the time-out time included in the command signal to the first time amount included in the second response signal; and
    rescheduling, by the host, the plurality of command signals based on the first time amount included in the second response signal.

17. The method of claim 16, wherein the rescheduling includes rescheduling, by the host, the plurality of command signals by comparing the time-out times included in the plurality of command signals.

18. The method of claim 16, further comprising:
decreasing, by the host, a priority of a respective command signal as the first time amount included in the second response signal increases.

19. The method of claim 16, further comprising:
transmitting a command signal having a highest priority among the rescheduled command signals from the host to the storage device.

20. A method of operating a storage device, the method comprising:
receiving, at the storage device, a command signal including a time-out time and an indication to perform an operation, the command signal being received from a host, the time-out time being an indication of amount of time during which the host will wait for a response from the storage device before resending the command signal;

determining, at the storage device, a first time amount, the first time amount being an estimate of an amount of time that would elapse between a point in time when the storage device begins performing the operation and a point in time when the storage device completes the operation if the storage device were to perform the operation;

deciding, at the storage device, whether to send the determined first time amount to the host, the deciding being based on the time-out time and the determined first time amount; and sending the determined first time amount from the storage device to the host based on the deciding.

* * * * *